Dec. 14, 1965    G. I. McNEIL    3,223,765
METHOD FOR MAKING COMPOSITE SECTIONS FOR USE
AS CRAWLER TRACKS AND THE LIKE
Filed May 9, 1962    4 Sheets-Sheet 1
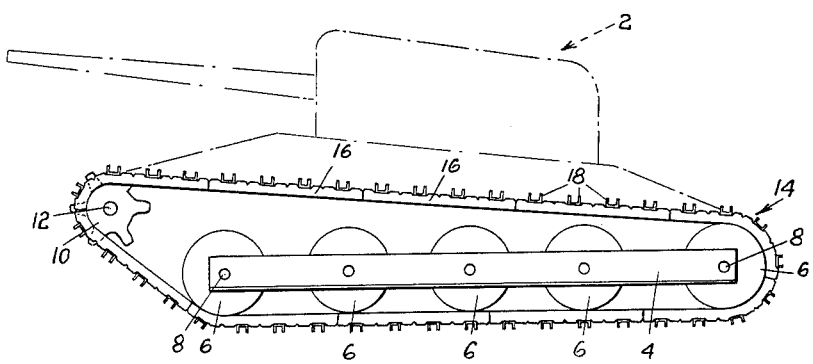
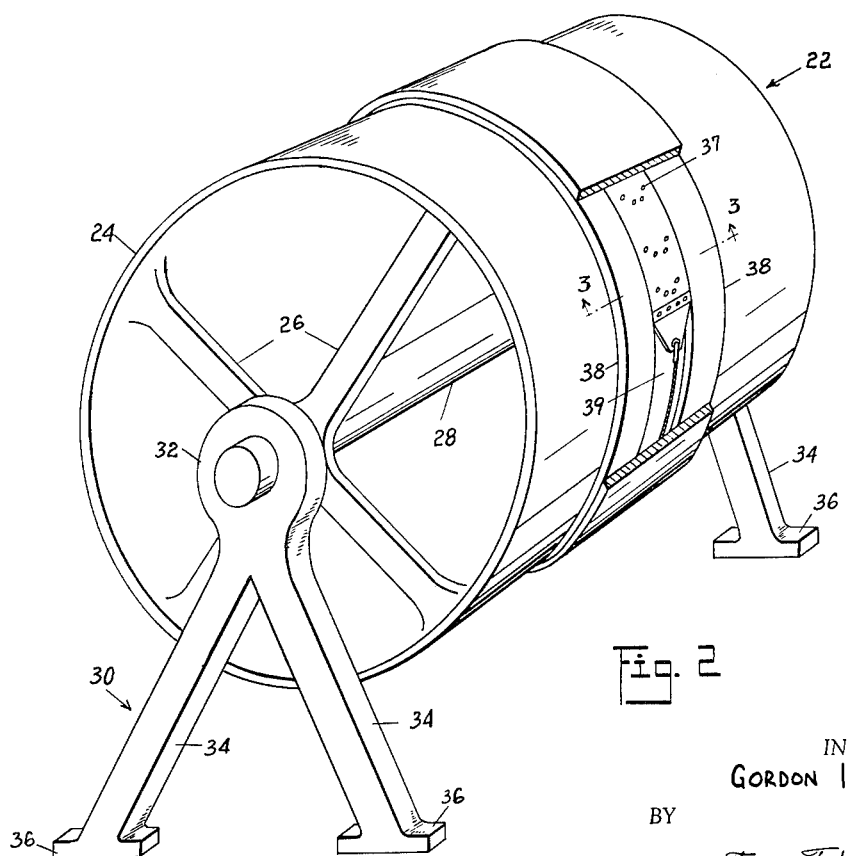
INVENTOR.
GORDON I. McNEIL
BY
Teare, Fetzer + Teare
ATTORNEYS

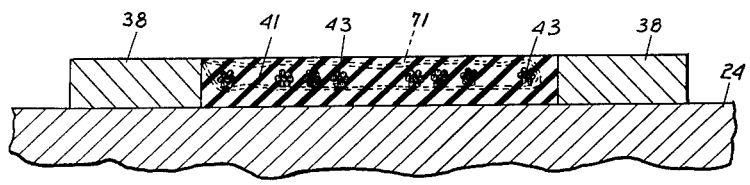

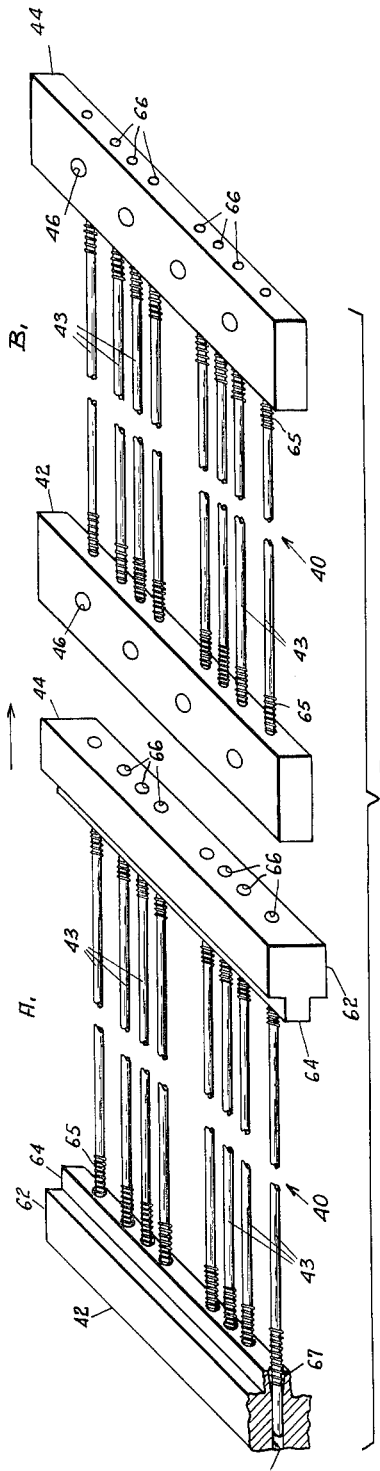
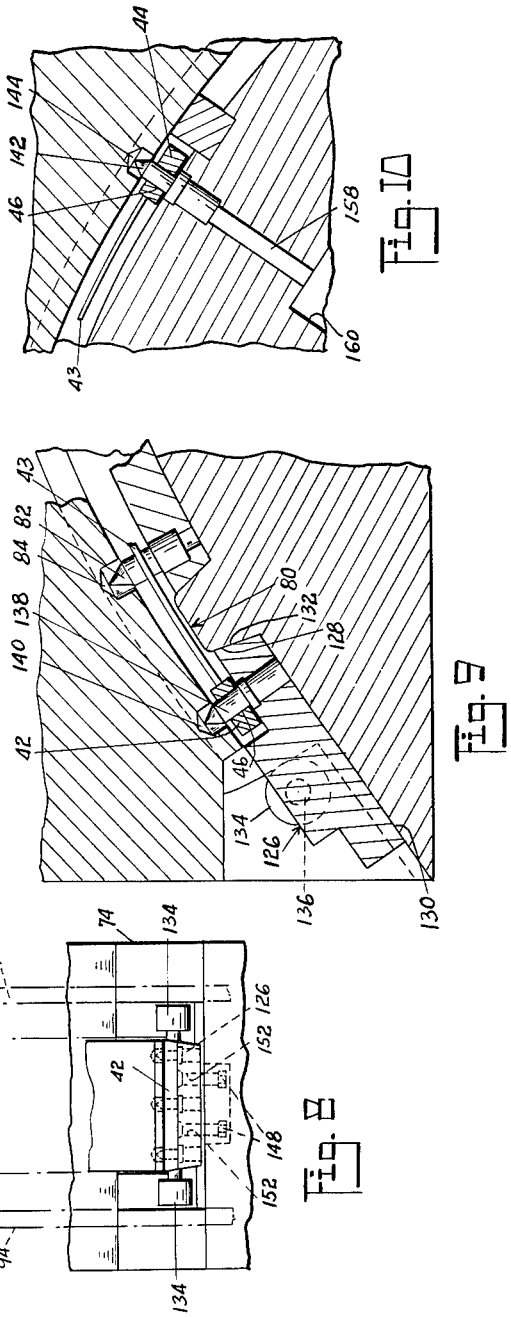
INVENTOR.
GORDON I. McNEIL

Dec. 14, 1965  G. I. McNEIL  3,223,765
METHOD FOR MAKING COMPOSITE SECTIONS FOR USE
AS CRAWLER TRACKS AND THE LIKE
Filed May 9, 1962  4 Sheets-Sheet 4

INVENTOR.
GORDON I. McNEIL
BY
Teare, Fetzer & Teare
ATTORNEYS

United States Patent Office 3,223,765
Patented Dec. 14, 1965

3,223,765
METHOD FOR MAKING COMPOSITE SECTIONS FOR USE AS CRAWLER TRACKS AND THE LIKE
Gordon I. McNeil, 330 E. Perry St., Port Clinton, Ohio
Filed May 9, 1962, Ser. No. 193,495
5 Claims. (Cl. 264—229)

This invention relates to a method for making composite rubber sections adapted for general use in making endless belts for crawler tracks or the like.

In the past various efforts have been made to make endless belts intended for use as crawler tracks on tractors, military vehicles and other similar land driven vehicles. In such cases, the belts were made of a series of sections comprised of rubber or other such rubberized material having inserts, such as steel cables extending lengthwise of the section which were embedded therein to reinforce and strengthen the rubber sections. In the conventional manner, each composite rubber section was formed by applying rubber material to a flat molding surface formed between the press heads of a conventional rubber press. The metallic inserts or cables were then placed in the uncured rubber along with a suitable fabric material, whereupon the press was closed and the rubber was subjected to a vulcanizing operation to cure and envelop the rubber and fabric material around the metallic inserts. Each of the sections thus made was joined in a manner to provide an endless belt which was then utilized, for example, as a crawler track for a tractor or other such land driven vehicle. Heretofore, difficulties have arisen in maintaining accurate alignment or parallelism between the respective metallic inserts during the curing or vulcanization of the rubber when molded in such flat molds. It has been experienced, particularly when forming and vulcanizing the rubber section from a flat molding surface, that during such operations a myriad of pressures often in excess of 2000 p.s.i. are exerted against the rubber. Such pressures result in a distortion of the metallic inserts such that they are not in alignment or parallelism in the finished vulcanized rubber section. Moreover, it has been found that such distortion of the metallic inserts provides a weakened rubber section caused by the non-uniform wear of the metallic inserts which results in a greatly reduced belt life and promotes a condition of premature belt failure.

Accordingly, it is primary object of the present invention to provide a method for making composite sections adapted for use in making endless belts for crawler tracks or the like.

Another object of the present invention is to provide a method for making a composite rubber section having metallic inserts embedded therein, whereby the rubber can be molded and vulcanized around the metallic inserts with distortion, thereby greatly increasing the life of a belt made of a plurality of such composite sections.

A further object of the present invention is to provide a method for making a composite rubber section having metallic inserts embedded therein, whereby the rubber can be formed upon a curved molding surface and vulcanized around the metallic inserts without distortion, thereby greatly increasing the life of a belt made from a plurality of such composite sections.

A still further object of the present invention is to provide a more simplified and economical method for making composite rubber sections which are intended for use in making endless belts for crawler tracks or the like for land driven vehicles.

Further objects and advantages and other new and useful features in the present method for providing a composite rubber section will be apparent to those skilled in the art, as the following description proceeds with reference to the accompanying drawings, for purposes of illustration, but not of limitation, in which like reference characters designate like parts throughout, wherein:

FIG. 1 is an elevational view showing a conventional sprocket and wheel arrangement mounting an endless crawler belt made of the composite rubber sections embodying the present invention and adapted for use for military vehicles or other such land driven vehicles;

FIG. 2 is a perspective view of the rotatable band or drum arrangement showing the composite rubber sections of the present invention mounted thereon;

FIG. 3 is a vertical cross-sectional view taken along lines 3—3 looking in the direction of the arrows in FIG. 2;

FIG. 4 is an enlarged fragmentary front elevational view of the rotatable band or drum arrangement of FIG. 2, showing a turn-buckle arrangement of the present invention for tensioning the metallic inserts;

FIG. 5 is a diagrammatic representation showing the sequential operation for forming the framework sections which support the metallic inserts of the present invention;

FIG. 8 is a partial end view of the modification of FIG. 6;

FIG. 9 is an enlarged sectional cross sectional view taken along lines 9—9 of FIG. 7;

FIG. 10 is an enlarged cross sectional view taken along lines 10—10 of FIG. 7.

Figure 6:
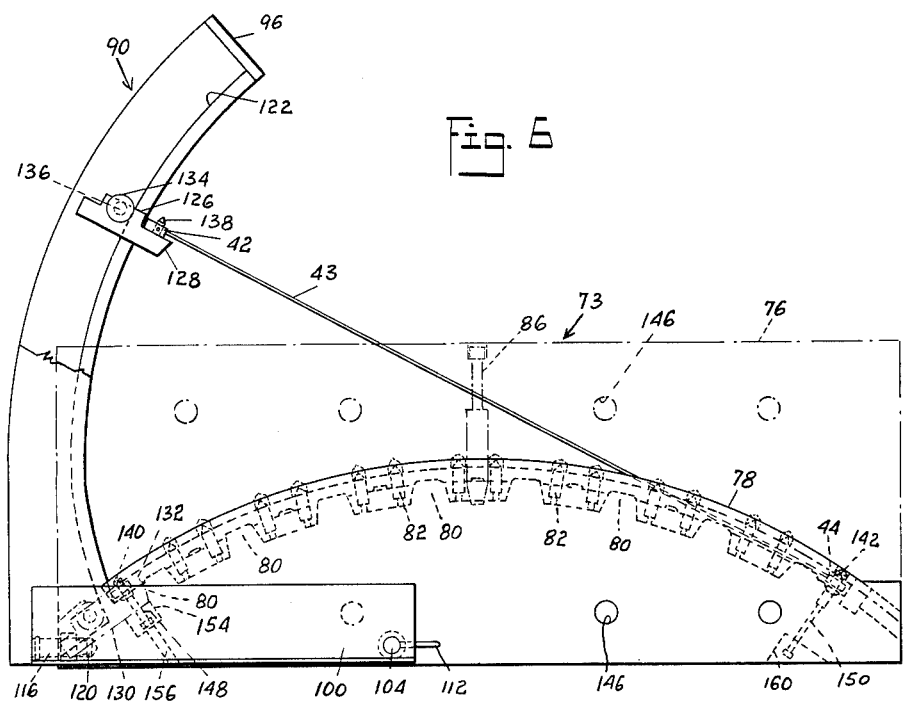
FIG. 6 is a front elevational view with parts broken away of a modification of the present invention showing the metallic insert supporting carriage mounted on a loading rack in loading (solid line) position and in completely loaded or tensioned (dotted line) position adapted for tensioning the metallic inserts upon a convex mold surface.
Figure 7:
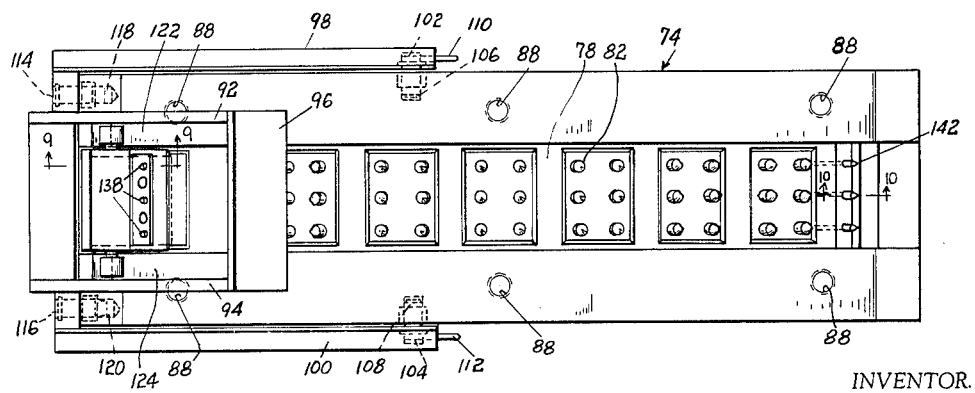
FIG. 7 is a top plan view of the modification of FIG. 6.

The foregoing objects are basically accomplished in accordance with this invention by molding a section comprising, placing amounts of rubber and/or fabric material in a mold cavity defined by a generally curved supporting surface, and by laying a plurality of metallic inserts lengthwise in the cavity and tensioning them in an amount sufficient to maintain parallelism therebetween. Additional rubber and/or fabric material may then be applied to the mold cavity to completely cover the metallic inserts therein, whereupon the rubber and fabric material may then be subjected to vulcanizing operation to form the finished composite rubber section. The section thus formed may then be removed from the mold cavity, and connected to other similarly formed sections to make an endless belt, for use as crawler tracks on tractors, military vehicles, or other such similar land driven vehicles. The foregoing invention, as basically described, may be carried out in several modified forms, which will be hereinafter more fully described.

Generally, FIG. 1 is a diagrammatic representation illustrating a typical application of the composite rubber sections embodying the present invention. As shown, a conventional crawler arrangement adapted for use with military vehicles, such as a tank 2 or the like, may comprise longitudinal frame members 4 supporting a plurality of wheels 6 rotatably mounted thereon by means of axles 8. Sprocket wheels 10 in turn may be mounted on stub shafts 12 adapted for driving engagement with the endless crawler belt, shown generally at 14. The crawler belt 14 embodying the present invention may be formed of a plurality of composite rubber sections 16 secured in end-to-end relation to form an endless belt. As shown, each composite rubber section may be provided with a plurality of gripping means or plates 18, whereby the vehicle may be propelled along the ground.

Referring now to FIGS. 2 through 4 of the drawings, there is illustrated a band or drum arrangement shown generally at 22, which is adapted to be moved into a curing or vulcanizing oven (not shown). The drum may include a cylindrical shell 24 having a plurality of spokes 26 extending inwardly to rotatably support the shell on an axle 28 which extends through the longitudinal axis of the shell. The axle 28 may be supported at its ends by a pair of generally inverted Y-shaped supporting brackets 30 including oppositely disposed journals 32 for receiving the respective ends of the axle 28. The brackets 30 include downwardly and outwardly extending legs 34 which may be formed at their ends with feet or flange portions 36 for providing additional support to the drum or band arrangement.

As shown, the drum arrangement includes a pair of oppositely disposed endless mold forming members 38 which extend around the periphery of the curved or cylindrical surface of the rotatable shell 24 to form, therebetween, an endless mold cavity 39. The endless mold forming members 38 may be permanently or removably secured to the shell, such as by spot welding or the like, and are spaced apart a distance sufficient to provide a composite rubber section of the desired width. In this form, the mold cavity 39, formed between the endless mold members 38, may be provided with a plurality of spaced rows of core elements 37 which are secured to the bottom of the mold cavity. The core elements 37 are of a sufficient length to penetrate through the material to be vulcanized, such that spaced rows of apertures will be formed in the finished composite rubber section. Forming the composite rubber sections in this manner, allows gripping plates 18 or other such equipment to be fastened to the endless belts when making crawler tracks for military vehicles, or other such similar land driven vehicles.

As shown at FIGS. 4 and 5 of the drawings, the endless mold members 38 may be spaced apart a distance sufficient to slidably receive an insert supporting framework section, shown generally at 40. As shown, each framework section may include a pair of spaced tensioning bars 42 and 44 which are formed to fit lengthwise between the opposed endless mold members 38. Each pair of tensioning bars 42 and 44 may be formed to receive a plurality of metallic inserts 43, such as steel cables, wires or the like, which extend therebetween and are arranged in any suitable pattern. For example, the metallic inserts may be arranged in a one, three, three, one pattern as shown, depending on the strength and flexing requirements of the finished endless belt or crawler track. The tensioning bars 42 and 44 may be provided on their outer edges with flanges 45 which are spot welded, or otherwise secured thereto, and which provide apertures 46 for attachment to a turnbuckle 48. Here, the turnbuckle 48 may be of a conventional construction, whereby clockwise rotation of the threaded sleeve 50 relative to the threaded rods 51 of the turnbuckle cause relative outward movement between the tensioning bars 42 and 44 which results in a tensioning of the metallic inserts 43 supported between the tensioning bars. Conversely, rotation of the sleeve 50 in a counterclockwise direction results in a loosening of the tensioning bars, whereupon the vulcanized composite rubber section may be easily removed from the drum or band assembly. In this form, any number of framework sections and of any predetermined length may be applied in side by side relationship to the drum assembly. Usually the framework sections 40 are about 30 inches in length and of a width substantially equal to the finished endless belt or crawler track for which it may be applied.

In order to maximize the flexibility of the composite rubber sections, the arc or curved surface presented by the cylindrical drum 22, and upon which the rubber is to be cured, may be predetermined in relation to the sprocket 10 or wheel 6 dimension of the vehicle to which the completed endless belt or crawler track 14 may be applied. It has been found, for example, that when the sprocket or wheel diameter is in the order of about 20 inches, that the diameter of the drum may be about 40 inches or approximately in a ratio of 1:2. In this manner, when the diameter of the arc on which the rubber is cured is approximately twice the diameter of the wheel or sprocket, over which the endless belt or crawler 14 runs, the latter will tend to flex substantially an equal amount in either direction upon passing over the sprockets and wheels in a single revolution of the belt. Moreover, by providing such a curved surface there is achieved not only a facility for maintaining parallelism between the metallic inserts during the curing operations by tensioning the inserts against such surface but there is also attained a composite rubber section with improved characteristics of wear and flexibility.

The framework section 40, of the present invention may be made by a suitable forming operation, such as swaging or forging, best shown diagrammatically at FIG. 5. Here, the tensioning bars 42 and 44, before being subjected to the forming operation, may be of a generally T-shaped configuration having upstanding flange portions 62 and outwardly extending body portions 64. The body portions 64 of the tensioning bars may be formed with a plurality of longitudinal slots 66 extending therethrough for receiving the free ends of the metallic inserts 43. The number and arrangement of the slots, as noted, will depend upon the number of metallic inserts to be enveloped in the finished composite rubber section. In this form, the slots 66 are shown as tapering upwardly and outwardly, as at 67, toward the base of the body portion 64. Such a taper or bell mouth configuration facilitates insertion of the free ends of the metallic inserts 43 and allows the metal to close around the free ends of the inserts during the forming operation for securing the inserts therein. Before inserting the free ends of the metallic inserts 43 into a pair of opposed tensioning bars, resilient reinforcing means 65, such as coil springs, nylon sleeves or the like, may be applied around the metallic inserts and in abutting relation against the tensioning bars 42. The resilient means 65 act to reinforce the metallic inserts during the forming operations and prevent weakening of the inserts, which would otherwise result from excessive flexure of the inserts relative to the tensioning bars. Having inserted the metallic inserts, the framework sections may then be subjected to a forming operation whereby suitable pressure applying means (not shown) form the tensioning bars 42 and 44 into generally rectangular configurations, such as shown generally at B of FIG. 5. Thus, the tapered portions 67 of the slot 66 are closed around the free ends of the metallic inserts 43 under applied pressure to permanently secure the metallic inserts in and between the tensioning bars 42 and 44.

Having thus secured metallic inserts 43, the tensioning bars 42 and 44, as aforementioned, may be provided with a plurality of spaced slots 46 which may be formed by suitable drilling operations. The slots 46 provide means for joining the composite rubber sections 10 in end-to-end relation to form the endless crawler back or belt 14, in addition to acting as guide slots for tensioning the metallic inserts, as will be more fully described, in another form of the present invention.

In a typical application of making the composite rubber sections embodying this form of the invention, the band or drum 22 may be loaded with a predetermined number of uncured rubber strips 41 which are placed across the endless mold members 38, such as to fill the bottom of the mold cavities formed therebetween. A fabric material 71, in the form of nylon tire cord or similar such material, may then be positioned in the mold acvity to cover the surface of the uncured rubber strip, best shown at FIG. 3. Having secured the metallic inserts 43 between the tensioning bars 42 and 44 in the manner described, the completed framework section 40 may then be placed in the mold cavity 39 between the opposed endless mold members 38 and secured thereon by means of the turnbuckle 48. The threaded sleeve 50 of the turnbuckle may then be rotated clockwise in an amount sufficient to provide the proper amount of tension to the metallic inserts 43, such that parallelism will be maintained between the respective metallic inserts during the curing or vulcanizing operation. Having applied the desired amount of tension to the metallic inserts, the drum 2 may then be moved, as a unit, into a suitable oven (not shown), whereupon the uncured rubber may be molded around the inserts by a customary vulcanizing operation to form a composite rubber section. The finished composite rubber sections 16 may then be joined together to form an endless belt 14, such as shown at FIG. 1.

In another form of the invention, rather than utilizing the band or drum arrangement in conjunction with a curing or vulcanizing oven, the composite rubber sections 16 embodying the present invention may be formed in a molding and vulcanizing apparatus, shown generally at 73 of FIGS. 6 to 10. In this form, the molding apparatus may comprise a convex 74 mold member and a removable concave 76 mold member, shown in dotted lines at FIG. 6. The convex mold member 74 may be formed to provide a longitudinally extending mold cavity 78 having spaced coring ribs 80 extending transversely of the cavity which act to core the composite rubber sections and which act to support the metallic inserts 43 secured within the mold cavity.

As shown in FIGS. 6 and 9, the mold cavity 78 may be provided with a plurality of spaced rows of core pins 82 which are adapted to be received in corresponding bores 84 formed in the upper or concave mold member 76 to provide apertures in the composite rubber sections and for the purposes, as aforementioned. The concave mold member 76 may be provided with suitable guide pins 86 which are adapted for registration with bores 88 formed in the convex mold member to maintain alignment of the mold members during the vulcanizing operations.

In this form, to apply and maintain tension on the metallic inserts during the vulcanizing operation, the convex mold member 74 may be provided with a loading rack, shown generally at 90. The loading rack may be formed, as a unit, comprising a pair of oppositely disposed generally curved framework members 92 and 94 joined adjacent one end by means of a cross plate 96, which may be spot welded or otherwise secured to the framework members. The respective framework members may be provided adjacent their other ends with generally L-shaped arm members 98 and 100 made integral therewith and extending inwardly on either side of the convex mold member 74. The respective arm members 98 and 100 may carry adjacent their free ends lug pins 102 and 104 and suitable activating handles 110 and 112 for slidable insertion within corresponding bores 106 and 108 formed in the convex mold member. In a like manner, the arm members 98 and 100 may be provided adjacent their L-shaped ends with lug pins 114 and 116 adapted for slidable engagement with corresponding bores 118 and 120 formed in the end portion of the convex mold member. Such a pin and bore arrangement permits removal of the loading rack 90, as a unit, after tensioning of the metallic inserts 43, whereby the upper or concave mold member 76 may then be closed over the cavity for the vulcanizing operation.

To provide a cam and cam follower arrangement for applying tension to the metallic inserts, the framework members 92 and 94 may be formed having inwardly extending flanges 122 and 124 which act as cam or guide tracks for a cam follower or carriage assembly 126. The carriage assembly may be of a generally truncated configuration having a tapered face portion 128 which is adapted to be secured within a recessed portion 130 formed in the convex mold member 74 to frictionally abut against the oppositely tapered side portion 132 of an adjacent core rib 80, best shown in FIG. 9. Wheels 134 are rotatably journaled on an axle 136 extending through the carriage assembly and spaced for slidable engagement on the flanges 122 and 124 of the framework members. The carriage assembly may be provided with spaced guide pins 138 adapted to be received in corresponding bores 140 formed in the concave mold member 76. As shown, the guide pins 138 are arranged for registration with the corresponding holes 46 formed in the tensioning bar 42 to secure the tensioning bar to the carriage assembly. The tensioning bar 44, best shown in FIG. 10, may be secured within the mold cavity 78 adjacent the other end of the convex mold member by means of spaced guide pins 142 secured to the convex mold member and adapted for registration with the corresponding holes 46 formed in the tensioning bar 44 and bores 144 formed in the concave mold member 76.

In application of this form of the invention, the upper or concave mold member may be removed from the convex mold member and the loading rack 90 secured to the convex mold member by means of lug pins 102, 104, 114 and 116. The mold cavity 78 may then be filled with a predetermined number of uncured rubber strips 41 and fabric material 71, as aforementioned. Having secured the metallic inserts 43 between the tensioning bars 42 and 44, as described, the framework section 40 may then be secured within the mold cavity by first registering the tensioning bar 44 over the corresponding guide pins 142 adjacent one end of the convex mold member. The tensioning bar 42 may then be secured to the carriage assembly 126 by registering the tensioning bar over the corresponding guide pins 138 extending from the carriage assembly. A predetermined amount of pressure, sufficient to maintain the parallelism between the metallic inserts during the vulcanizing operation, may then be provided by positioning the carriage assembly 126 on the loading rack. The carriage assembly may then be forced downwardly over the curved surface presented by the loading rack, manually or by suitable motive power means, causing the metallic inserts to achieve the maximum desired amount of tension, as the carriage assembly is brought into frictional engagement within the recess portion 130 formed in the convex mold member and against the side portion 132 of the core rib 80. It can be seen that by varying the extent of curvature of the loading rack 90, it is possible to effect any predetermined amount of tension on the metallic inserts 43, which remain affixed at one end to the convex mold member. The loading rack may then be removed from engagement with the convex mold member by pulling outwardly on the handles 110 and 112, whereupon the concave mold member may then be closed over the cavity 78 for vulcanizing the uncured rubber and fabric material around the metallic inserts. The concave mold member may be provided with suitable heating passages 146 for effecting the desired degree of vulcanization of uncured rubber within the mold.

To remove the composite rubber section upon completion of the vulcanizing operation, a plurality of ejector pins 148 and 150 may be provided which force the tensioning bars 42 and 44 from the respective guide pins 138 and 142. As shown in FIGS. 6 and 8, ejector pins 148 may be slidably mounted within slots 152 formed in the carriage assembly 126 which in turn extend downwardly into a recessed portion 154 provided in the convex mold member. The recessed portion 154 may be formed with a channel 156 which communicates with the exterior of the mold member to allow a hand tool or other suitable motor means to be brought into contact with the ejector pins 148 to force them upwardly, thereby causing ejection of the tensioning bar 42. Similarly, ejector pin 150 may be slidably mounted in slots 158 formed in the convex mold member and adapted to extend downwardly into a recess portion 160 which communicates, in a like manner, with the exterior of the mold member, whereby the ejector pins may be actuated by a suitable hand or motive power tool to cause ejection of the tensioning bar 44.

As in the case of the cylindrical drum 22, the extent of curvature of the surface presented by the convex mold member 74 may be predetermined in relation to the wheel or sprocket dimension of the vehicle to which the completed endless belt or crawler track may be applied. As noted, a ratio of curvature of about 1:2 has been found satisfactory to maximize the flexibility of the composite rubber sections and to maintain parallelism between the metallic inserts during the vulcanizing operation.

Accordingly, it can be seen that many important advantages result from the principles embodying the present invention. The tension applied to the metallic inserts such as steel cables, wires or the like, in the manner prescribed, maintains a constant alignment or parallelism between adjacent inserts, such that the inserts are not distorted from either the horizontal or vertical plane, as a result of the pressure applied to the rubber section during the curing or vulcanizing operation. The maintenance of a proper insert alignment provides a finished composite rubber section having a uniform strength wherein the inserts are not distorted to cause ununiform flexing and thereby resulting in a weakened section with consequent premature failure in the crawler tract itself. Furthermore, the increased belt life provides a substantial economic saving, not only from a construction and material standpoint, by providing a thinner composite rubber section, but from an operational standpoint due to the minimization of machine-down time caused by frequent replacement of the broken, or worn belts.

I have shown and described what I consider to be the preferred embodiment of my invention, together with suggested modified forms, and it will be obvious to those skilled in the art that other changes may be made without departing from the scope of my invention as defined by the appended claims.

I claim:

1. A method of making an endless belt having improved strength and wear-resistant characteristics from a plurality of composite, segmental sections to be applied to track laying vehicles of the type including at least one wheel or the like, the steps comprising, providing a lower mold member and an upper engageable mold member which together define a mold cavity, said mold cavity having a radius of curvature which is substantially greater than the radius of curvature of the wheel to which the belt is to be applied, attaching a plurality of elongated metallic inserts at one end in laterally spaced, stationary relationship to said lower mold member, applying tension to the other end of said inserts in an amount sufficient to draw said inserts downwardly into spaced, parallel relationship within the cavity of said lower mold member, supporting said tensioned inserts in predetermined spaced relationship from the bottom of the cavity of said lower mold member, filling said cavity with rubber-like material, engaging said upper mold member over said lower mold member, vulcanizing the rubberized material around said tensioned inserts under heat and pressure wherein the tension on said inserts and the reactive force imparted thereto by the radius of curvature of the cavity in said lower mold member coact to maintain the inserts in said spaced, parallel relationship to provide a composite, segmental section, and subsequently removing said section from between the upper and lower mold members and joining a plurality of such sections together in end-to-end relationship to provide an endless belt.

2. A method in accordance with claim 1, wherein the ratio of the radius of curvature of said wheel to the radius of curvature of said mold cavity is approximately 1:2.

3. A method of making an arcuate, composite segmental section for use in making endless belts to be applied to track laying vehicles of the type including at least one rotatable member, such as a wheel or the like, the steps comprising, providing a curved supporting member having a cavity therein, said cavity having a radius of curvature which is greater than the radius of curvature of said rotatable member to which the belt is to be applied, filling said cavity with a rubber-like material, positioning a plurality of elongated metallic inserts in spaced, parallel relationship within said cavity, supporting said inserts in predetermined spaced relationship from the top and bottom of said cavity, attaching said inserts at one end in stationary relationship within said cavity, applying tension to the other end of said inserts in an amount sufficient to draw the inserts supported within said cavity around said curved supporting member, whereby the tension on said inserts and the reactive force imparted thereto by said curved supporting member coact to maintain the spaced, parallel relationship of said inserts during closure of said mold cavity with an upper closure member thereby causing substantial flow of said rubber-like material, and curing said rubber-like material to provide a composite, segmental section having improved strength and wear-resistant characteristics, and removing the composite, segmental section from the cavity, and subsequently joining a plurality of said sections together in end-to-end relationship to provide an endless belt.

4. A method in accordance with claim 3, wherein the ratio of the radius of curvature of said rotatable member to radius of curvature of said cavity is approximately 1:2.

5. A method in accordance with claim 3, wherein the cavity is filled with a rubber-like material after tension is applied to said inserts.

References Cited by the Examiner

UNITED STATES PATENTS

| | | | |
|---|---|---|---|
| 1,255,099 | 1/1918 | Lewis | 264—257 |
| 1,355,534 | 10/1920 | Buchmann | 264—275 |
| 1,898,031 | 2/1933 | Carter | 264—326 |
| 1,914,487 | 6/1933 | Carter | 264—326 |
| 2,422,266 | 6/1947 | Steinke | 18—59 |
| 2,456,580 | 12/1948 | Carter et al. | 18—59 |
| 2,876,499 | 3/1959 | Schultz | 264—277 |
| 2,925,623 | 2/1960 | Belkadolph | 264—277 |
| 3,021,241 | 2/1962 | Schneiderman et al. | 264—317 |
| 3,056,633 | 10/1962 | Lucas et al. | 305—38 |
| 3,072,967 | 1/1963 | Mathews et al. | 18—36 |
| 3,074,116 | 1/1963 | Green | 264—277 |
| 3,084,390 | 4/1963 | Anderson | 18—36 |
| 3,114,598 | 12/1963 | Belkadolph et al. | 264—277 |
| 3,120,409 | 2/1964 | Beall | 305—38 |

ROBERT F. WHITE, *Primary Examiner.*

LESLIE H. GASTON, ALEXANDER H. BRODMERKEL, *Examiners.*